US008911537B2

(12) United States Patent
Han et al.

(10) Patent No.: US 8,911,537 B2
(45) Date of Patent: Dec. 16, 2014

(54) ADSORBENT OF VOLATILE ORGANIC COMPOUNDS AND ADSORPTION METHOD USING THEREOF

(75) Inventors: Yang-Kyoo Han, Seoul (KR); Je-Gwon Lee, Seoul (KR); Su-Hwa Kim, Seongnam-si (KR)

(73) Assignees: LG Chem, Ltd., Seoul (KR); IUCF-HYU (Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 13/880,326

(22) PCT Filed: Aug. 26, 2011

(86) PCT No.: PCT/KR2011/006336
§ 371 (c)(1),
(2), (4) Date: Apr. 18, 2013

(87) PCT Pub. No.: WO2012/057444
PCT Pub. Date: May 3, 2012

(65) Prior Publication Data
US 2013/0220121 A1    Aug. 29, 2013

(30) Foreign Application Priority Data

Oct. 29, 2010 (KR) .................. 10-2010-0107068

(51) Int. Cl.
| | | |
|---|---|---|
| *B01D 53/02* | (2006.01) | |
| *B01J 20/28* | (2006.01) | |
| *C08F 120/56* | (2006.01) | |
| *C08F 220/56* | (2006.01) | |
| *B01J 20/26* | (2006.01) | |
| *C08F 220/60* | (2006.01) | |
| *C08F 120/60* | (2006.01) | |

(52) U.S. Cl.
CPC .......... *B01J 20/261* (2013.01); *B01J 20/28085* (2013.01); *B01D 2253/308* (2013.01); *C08F 120/56* (2013.01); *C08F 220/56* (2013.01); *B01D 53/02* (2013.01); *B01J 20/28004* (2013.01); *B01D 2253/202* (2013.01); *B01D 2257/708* (2013.01); *C08F 220/60* (2013.01); *B01J 20/28083* (2013.01); *B01J 20/28023* (2013.01); *C08F 120/60* (2013.01); *B01D 2253/304* (2013.01)
USPC .................. 95/141; 96/108; 526/305; 502/402

(58) Field of Classification Search
CPC ................... B01D 2253/202; B01D 2253/304; B01D 2253/308; B01D 2257/708; B01D 53/02; B01J 20/261; B01J 20/28004; B01J 20/28083; B01J 20/28085; C08F 120/56; C08F 120/60; C08F 220/56; C08F 220/60
USPC ................ 95/141; 526/305; 502/402; 96/108
See application file for complete search history.

(56) References Cited

U.S. PATENT DOCUMENTS

| | | | |
|---|---|---|---|
| 4,062,831 A | 12/1977 | Kopecek et al. | |
| 5,300,537 A | 4/1994 | Muller et al. | |
| 6,117,935 A * | 9/2000 | Schofield et al. | ............. 524/555 |
| 2001/0020050 A1 | 9/2001 | Jansen et al. | |
| 2008/0261043 A1 | 10/2008 | Greiner et al. | |
| 2013/0216472 A1 * | 8/2013 | Han et al. | ................... 423/648.1 |

FOREIGN PATENT DOCUMENTS

| | | |
|---|---|---|
| JP | 2000-319335 | 11/2000 |
| KR | 10-0342668 B1 | 6/2002 |
| KR | 10-2003-0049208 A | 6/2003 |
| KR | 10-2005-0056288 A | 6/2005 |
| KR | 10-541748 B1 | 12/2005 |
| KR | 10-2006-0006368 A | 1/2006 |
| KR | 10-0589642 B1 | 6/2006 |
| KR | 10-2009-0095725 A | 9/2009 |
| KR | 10-2010-0023946 A | 3/2010 |
| KR | 10-0952945 B1 | 4/2010 |
| KR | 10-2010-059031 A | 6/2010 |
| KR | 10-0967622 B1 | 6/2010 |
| WO | 2009-140381 A1 | 11/2009 |

OTHER PUBLICATIONS

Huang, et al, A Review on Polymer Nanofibers by Electrospinning and Their Applications in Nanocomposites, Composites Science and Technology, 2003, p. 2223-2253, vol. 63.
Lee et al, Nanofibers: Preparations and Applications, KIC News, 2010, p. 32-35 (plus English Abstract), vol. 13, No. 1.
Kim, Jo-Chun, Trends and Control Technologies of Volatile Organic Compound, Journal of Korean Society for Atmospheric Environment, 2006, p. 743-757, vol. 22, No. 6.
Meechaisue et al, Electrospun Mat of Tyrosine-Derived Polycarbonate Fibers for Potential Use as Tissue Scaffolding Material, 2006, p. 1039-1056, vol. 17, No. 9.
Son et al, Adsorption Characteristics of Three-Components Volatile Organic Compounds on Activated Carbonaceous Adsorbents, Korean Chem. Eng. Res., Dec. 2006, p. 669-675, vol. 44, No. 6.

* cited by examiner

*Primary Examiner* — Christopher P Jones
(74) *Attorney, Agent, or Firm* — McKenna Long & Aldridge, LLP

(57) ABSTRACT

The present invention relates to an adsorbent of volatile organic compounds (VOCs) comprising a novel mesoporous polymer, that shows improved adsorption property, and adsorption method of VOCs using thereof.
The adsorbent comprises an acrylamide-based polymer.

9 Claims, 5 Drawing Sheets

ADSORBENT OF VOLATILE ORGANIC COMPOUNDS AND ADSORPTION METHOD USING THEREOF

This application is a National Stage Entry of International Application No. PCT/KR2011/006336, filed Aug. 26, 2011, and claims the benefit of Korean Application No. 10-2010-0107068 filed on Oct. 29, 2010, all of which are hereby incorporated by reference in their entirety for all purposes as if fully set forth herein.

TECHNICAL FIELD

The present invention relates to an adsorbent of volatile organic compound and adsorbent method. More particularly, the present invention relates to an adsorbent of volatile organic compounds (VOCs) comprising a novel mesoporous polymer, that shows improved adsorption property, and adsorption method of VOCs.

BACKGROUND ART

Volatile organic compounds (VOCs) cover any organic compound that can volatilize in the air. The examples of the VOCs may include various organic solvents or compounds such as benzene, toluene, chloroform, 1,2-dichloroethane, hexane, heptane, octane, nonane, decane, dodecane, tetradecane, diesel, kerosene, acetone, ethylacetate, dimethyl formamide, dimethyl sulfone, formaldehyde, tetrahydrofuran (THF) or their derivatives.

Since the VOCs can have harmful effects on human or environment, they are classified as toxic substances of the atmosphere. Further, the VOCs can generate various secondary pollutants through photochemical reactions, and contain various carcinogens.

Because of the harmful effects of the VOCs, attention is focused on an adsorbent effectively adsorbing and removing the VOCs. Until now, some materials such as porous inorganic particles (e.g., active carbon, silica gel, alumina or zeolite), functional fibers, non-woven fabrics prepared from the functional fibers or electrospun fibers, or functional polymer film has been known as adsorbents of the VOCs [*Composites Science and Technology*, 2003, 63, 2223-2253; *J. Biomater. Sci. Polym. Edu.* 2006, 17, 1039-1056; *Prospect of Industrial chemistry* (Korea), 2010, 13(1), 32-50; J. KOSAE, 2006, 22(6), 743-757; Korean Chem. Eng. Res., 2006, 44(6), 669-675; KR patent publication No. 2010-0059031; KR patent publication No. 2006-0006368; KR patent publication No. 2009-0095725, and so on.].

However, most of the conventional adsorbents cannot show sufficient adsorbent property of the VOCs.

DISCLOSURE

Technical Problem

Accordingly, the present invention provides an adsorbent of volatile organic compounds (VOCs) showing improved adsorption property, and adsorption method of VOCs using thereof.

Technical Solution

The present invention provides an adsorbent of VOCs comprising a novel acrylamide-based polymer comprising at least one repeating unit represented by Chemical Formula 1:

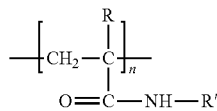

[Chemical Formula 1]

In Chemical Formula 1,
n is an integer of 15 to 1,800,
R is hydrogen or methyl; and
R' is X,

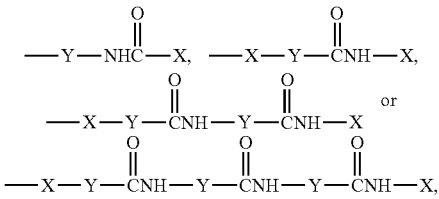

wherein X is —Z—R"; Y is alkylene having 1 to 10 carbon atoms; Z is arylene having 6 to 20 carbon atoms; and R" is a linear or branched hydrocarbon having 10 to 20 carbon atoms, or a linear or branched perfluorohydrocarbon having 10 to 20 carbon atoms.

In addition, the present invention provides an adsorption method of VOCs comprising the step of contacting and adsorbing VOCs onto the adsorbent of the present invention.

Hereinafter, the adsorbent and the adsorption method of VOCs according to the embodiment of the invention are described in more detail.

According to an embodiment of the invention, an adsorbent of VOCs comprising an acrylamide-based polymer comprising at least one repeating unit represented by Chemical Formula 1 is provided:

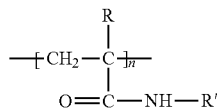

[Chemical Formula 1]

In Chemical Formula 1,
n is an integer of 15 to 1,800,
R is hydrogen or methyl; and
R' is X,

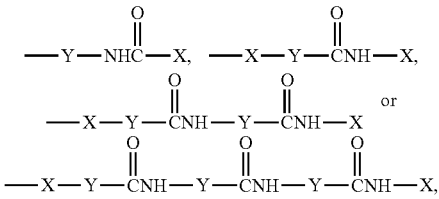

wherein X is —Z—R"; Y is alkylene having 1 to 10 carbon atoms; Z is arylene having 6 to 20 carbon atoms; and R" is a linear or branched hydrocarbon having 10 to 20 carbon atoms, or a linear or branched perfluorohydrocarbon having 10 to 20 carbon atoms.

The present inventors found that an adsorbent of VOCs comprising the specific acrylamide-based polymer shows significantly improved adsorption property of VOCs, and completed the present invention. In particular, as supported in the following examples, the acrylamide-based polymer can adsorb about 15 g or more, specifically about 19 g or more of VOCs (e.g., benzene) per 1 g of the polymer and show significantly improved adsorption property of VOCs compared to the conventional adsorvent. Thus, the adsorbent of VOCs comprising the polymer can be preferably used for adsorption and removal of various VOCs.

The reasons that the polymer and the adsorbent show improved adsorption property of VOCs presumably lie in the characteristic structure of the specific acrylamide-based polymer. The acrylamide-based polymer is prepared by an acrylamide-based monomer (hereinafter, the monomer of the following formula 2) through specific radical polymerization, for example RAFT polymerization, and the polymer can be a mesoporous polymer having a plurality of mesopores without additional chemical treating step.

The acrylamide-based monomer has a chemical structure that contains a self-assembling non-polar aliphatic hydrocarbon (having more than 10 carbon atoms), an arylene group causing π-π orbital interactions and an amide group causing intermolecular or intramolecular hydrogen bonding. Through the self-assembling behavior of the long-chain aliphatic hydrocarbon, π-π orbital interactions of the arylene groups and intramolecular hydrogen bonding of the amide groups, the monomer can form a regular monoclinic crystal structure, preferably a monoclinic single crystal in solid state.

As the specific radical polymerization is carried out on the monomer, a leaving radical polymerization occurs with the monomer molecules well-oriented, and thereby the individual monomer molecules are regularly arranged in the polymer chain. More specifically, the monomer molecules well-oriented through the polymerization combine together to form a polymer chain (i.e., one polymer building block), and these polymer building blocks aggregate to form a regularly arranged polymer. Due to the regular arrangement of the polymer building blocks in the polymer, the acrylamide-based polymer can include a large number of mesopores having a uniform pore size without a separate treatment after the polymerization reaction. For the same reason, the acrylamide-based polymer can exhibit crystallinity.

As the acrylamide-based polymer includes a large number of mesopores having a uniform pore size, and thereby has mesoporosity, the polymer and the adsorbent can effectively adsorb various VOCs in the mesopores. Thus, the polymer and the adsorbent can be preferably used for adsorption and removal of various VOCs.

Hereinafter, the acrylamide-based polymer and the adsorbent of VOCs comprising the polymer will be described in more detail.

In the acrylamide-based polymer used for adsorbent as a main component, Z is C6 to C20 arylene, and more specifically, can be

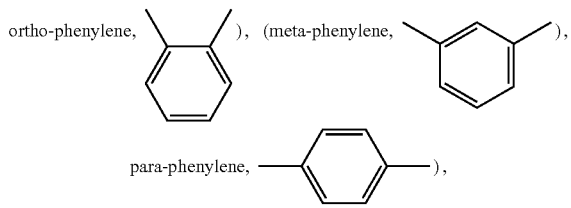

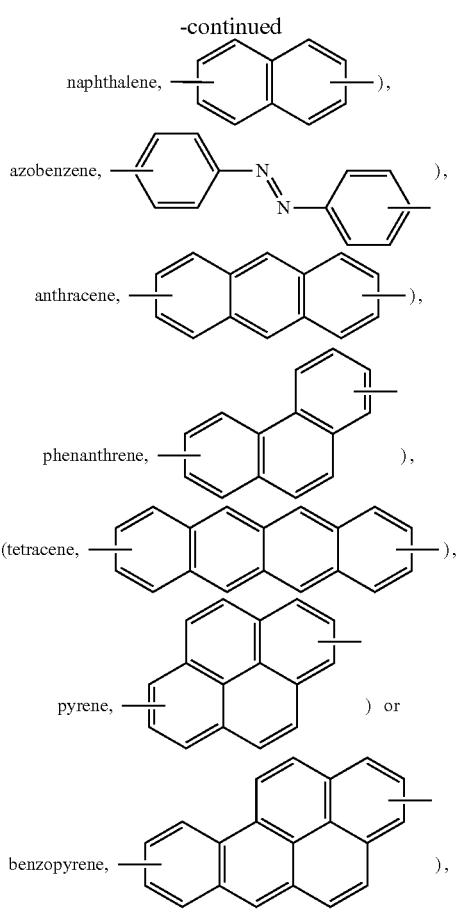

and the like.

R" is a linear or branched hydrocarbon substituted at the ortho-, meta- or para-position of the aromatic ring in Z, and the hydrocarbon has a long chain containing at least 10 carbon atoms, more specifically, 10 to 20 carbon atoms. Also, the hydrocarbon of R" may be substituted with Fluorine and be a linear or branched perfluorohydrocarbon having 10 to 20 carbon atoms.

The repeating unit of the above formula 1 and the monomer of the formula 2 given below have such a long-chain hydrocarbon and arylene, so the polymer more prominently exhibits such features as mesoporosity and crystallinity.

The polymer may be a homopolymer consisting of one repeating unit of formula 1, or a copolymer comprising at least two repeating units of formula 1.

The acrylamide-based mesoporous polymer includes a large number of mesopores having a diameter of about 2.0 to 10.0 nm, preferably about 2.0 to 6.0 nm, in the solid state. The term "diameter" of the pore as used herein is defined as the length of the longest straight line between two points on the circle, oval or polygon that is the cross-section in each pore. As described above, the polymer includes a large number of uniform mesopores in such a diameter range, and hence the adsorbent can show superior adsorption property of VOCs.

The polymer has a number-average molecular weight of about 5000 to 500000, preferably about 7000 to 300000. The polymer is a crystalline polymer having a melting point (Tm) of about 200 to 300° C., preferably about 220 to 280° C. Due to the melting point and the molecular weight in the ranges, the polymer can be excellent in thermal stability pertaining to high melting point and high molecular weight, easily produced in an electrospun fiber form simply by electrospinning or the like, and also maintaining its excellent mechanical properties such as strength.

From the structural analysis on the solid polymer using SAXS (Small Angle X-ray Scattering) and WAXS (Wide Angle X-ray Scattering), and the thermal analysis on the phase-transition temperature of the polymer by DSC (Differential Scanning calorimetry), the inventors of the present invention found out that the acrylamide-based polymer may be a crystalline polymer having a melting point in the above-mentioned range. Unlike the conventional polymers of up-to-date known similar structures, the polymer has mesoporosity and crystallinity. Due to the property such as the mesoporosity, the polymer and the adsorbent can effectively adsorb various VOCs such as benzene.

The inventors of the present invention also found out that the pore diameter on the polymer decreased with an increase in the annealing temperature during an annealing which was carried out on the polymer in the temperature range of at least about 200° C. and below the melting temperature, for example, between about 220° C. and 240° C. As the annealing temperature increased, the pore diameter decreased by about 0.4 to 0.7 nm, more specifically, by about 0.5 to 0.6 nm.

It was also revealed that the pore diameter on the polymer increased with a change in the chemical structure of R' bonded to the amide (—CO—NH—) group in the repeating unit of formula 1, or with an increase in the length of the aliphatic hydrocarbon bonded to the end of R', i.e., an increase in the number of carbon atoms of R". For example, the pore diameter increased by about 0.1 to 1.0 nm, more specifically, by about 0.2 to 0.7 nm as the number of carbon atoms increased from 12 to 16. The pore diameter also increased as the chemical structure of Z in R' changed from phenylene into another different aromatic structure such as naphthalene or anthracene.

The reason of the change in the pore diameter presumably lies in that the mesoporous three-dimensional structure (or, crystal structure) of the polymer changes by annealing process, by the changed chemical structure of R' bonded to the amide group, or by a change in the number of carbon atoms of R" bonded to the end of R'. This can be confirmed by the results of the DSC thermal analysis.

The pore size of the acrylamide-based polymer can be controlled easily by heat treatment, modification of functional group or the adjustment of hydrocarbon chain length in amide group of the repeating unit. Also, the pore size of the adsorbent comprising the polymer can be controlled easily. Thus, the adsorbent can have the controlled porosity and adsorption property according to the kind of VOC to be adsorbed or a required level of the adsorption property, and is preferably used for adsorption and removal of VOCs in the various fields.

Meanwhile, the acrylamide-based polymer can be included in the form of an electrospun fiber comprising the polymer, as well as in the form of a solid polymer powder, in the adsorbent of VOCs. The electrospun fiber, similarly to the polymer, shows a porosity including a plurality of uniform minute pores on the surface. Furthermore, the process of electro-spinning the mesoporous polymer can make the pore size formed on the surface be largerer and increase the porosity.

In addition, since the electrospun fiber is in the form of a fiber having an uniform diameter, it has very large surface area compared to the solid polymer powder. Thus, the adsorbent of VOCs comprising the polymer in the form of the electrospun fiber can show more improved adsorption property of VOCs. For example, the adsorption property of the adsorbent comprising the electrospun fiber may be at least about 10 times higher than the adsorbent comprising the solid polymer powder.

The electrospun fiber has a diameter of about 200 nm to 10 μm, and preferably about 250 nm to 7 μm. The term "diameter" of electrospun fiber as used herein is defined as the length of the longest straight line between two points on the circle, oval or polygon that is the cross-section in each fiber. The diameter of electrospun fiber can be controlled by the condition of electro-spinning, or the kinds of repeating unit and molecular weight of polymer. The electrospun fiber has various diameters within the ranges. Through the control of the scale of the electrospun fiber, the electrospun fiber and the adsorbent comprising thereof can have the controlled surface area and adsorption property, and is suitably used for adsorption and removal of VOCs in the various fields.

A plurality of pores on the surface of the electrospun fiber can be formed in a diameter of about 20 to 500 nm, preferably about 50 to 450 nm, and more preferably about 100 to 400 nm, and the pore can be distributed uniformly on the surface of fiber.

As described above, the porosity of the electrospun fiber is derived from the mesoporosity of acrylamide-based polymer, and increases more in the electro-spinning process, thereby providing the fiber with the plurality of uniform pore having the range of pore size. Due to the increased porosity of the electrospun fiber, the adsorbent comprising the fiber can show more improved adsorption property of VOCs.

Meanwhile, the acrylamide-based polymer and the electrospun fiber can be prepared by a method as described in the following.

Firstly, the acrylamide-based polymer can be prepared by performing the RAFT polymerization for the reactants containing at least one monomer represented by Chemical Formula 2, in the presence of radical initiator, and optionally the RAFT (reverse addition fragmentation transfer) agent; and precipitating the polymerization product in non-solvent:

[Chemical Formula 2]

wherein R and R' are as defined above.

The acrylamide-based monomer having a specified chemical structure of formula 2 is subjected to RAFT polymerization under specified conditions and then to precipitation in a nonsolvent to easily form the acrylamide-based mesoporous polymer having mesoporosity and crystallinity. The reason that the polymer prepared by this method has mesoporosity and crystallinity is already described enough and will not be mentioned hereinafter in any further detail.

It is therefore possible to prepare the acrylamide-based polymer having a large number of mesopores merely by a polymerization process alone without any other separate chemical treatment.

The preparation method may further comprise, prior to the polymerization step, preparing a reaction solution including the radical initiator, the RAFT agent, and the reactant; adding the reaction solution in a polymerization ampoule and eliminating oxygen by a freeze-thaw method; and sealing the ampoule. In this manner that the individual reactants and the initiator are added in the oxygen-free polymerization ampoule and then subjected to polymerization, the RAFT polymerization well-known as a kind of leaving radical polymerization takes place more adequately to form the acrylamide-based mesoporous polymer with a high polymerization conversion.

The preparation method may further comprise, after the precipitation step, dissolving the precipitated polymer product in an organic solvent; and re-precipitating the polymer product solution with a nonsolvent. The addition of the re-precipitation step helps the preparation of the acrylamide-based mesoporous polymer having crystallinity in a more preferable way.

In the preparation method, the monomer is any acrylamide-based monomer of formula 2 and may include, for example, N-(p-dodecyl)phenyl acrylamide (DOPAM), N-(p-tetradecyl)phenyl acrylamide (TEPAM), N-(p-hexadecyl)phenyl acrylamide (HEPAM), N-(p-dodecyl)naphthyl acrylamide (DONAM), N-(p-tetradecyl)naphthyl acrylamide (TENAM), N-(p-hexadecyl)naphthyl acrylamide (HENAM), N-(p-dodecyl)azobenzenyl acrylamide (DOAZAM), N-(-p-tetradecyl)azobenzenyl acrylamide (TEAZAM), N-(p-hexadecyl)azobenzenyl acrylamide (HEAZAM), or N-[4-(3-(5-(4-dodecyl-phenylcarbamoyl)pentyl-carbamoyl)-propyl) phenyl acrylamide (DOPPPAM). Of course, the monomer may be a mixture of at least two of those listed monomers.

The monomer may be a monoclinic crystal structure, preferably in the form of monoclinic single crystal, which can be supported by the following examples. As the monomer is obtained in the form of monoclinic single crystal and then subjected to RAFT polymerization to prepare a polymer, the individual monomer molecules in the polymer chain are more regularly arranged and better oriented to combine together and thereby more preferably form the polymer having mesoporosity and crystallinity.

To obtain the monomer in the form of single crystal, a crystal growth agent is added in a polar solvent and/or a nonpolar solvent after the synthesis of the monomer, to grow single crystals. The growth rate of the single crystal depends on the crystal growth time and temperature, or the chemical structure and concentration of the added crystal growth agent (e.g., seed crystal).

The radical initiator, the RAFT agent, and the monomer are dissolved in an organic solvent to prepare a reaction solution, and RAFT polymerization takes place in the reaction solution. The organic solvent as used herein includes at least one non-polar solvent selected from the group consisting of n-hexane, cyclohexane, benzene, toluene, chlorobenzene, dichlorobenzene, methylene chloride, or 1,2-dichloroethane; or at least one polar solvent selected from the group consisting of acetone, chloroform, tetrahydrofuran (THF), dioxane, monoglyme, diglyme, dimethylformamide (DMF), dimethylsulfoxide (DMSO), or dimethylacetamide (DMAC). The organic solvent may also be a mixture of the non-polar and polar solvents. The organic solvent can also be used in the re-precipitation step to dissolve the polymer product.

In the reaction solution, the monomer is dissolved in the organic solvent at a concentration of about 3.0 to 50 wt %, preferably about 5.0 to 40 wt % with respect to the weight of the organic solvent. The reaction solution in this concentration range makes the subsequent polymerization process work out in an efficient way.

The radical initiator used along with the monomer may be any known initiator for radical polymerization without limitation, including any one selected from the group consisting of azobisisobutyronitrile (AIBN), 2,2'-azobis-2,4-dimethylvaleronitrile, benzoyl peroxide (BPO), or di-t-butyl peroxide (DTBP); and at least two selected from the group of radical initiators.

The RAFT agent as used herein includes any thermal decomposition initiator such as S-1-dodecyl-S'-(α,α'-dimethyl-α"-acetic acid)trithiocarbonate, cyanoisopropyl dithiobenzoate, cumyldithiobenzoate, cumylphenylthioacetate, 1-phenylethyl-1-phenyldithioacetate, or 4-cyano-4-(thiobenzoylthio)-N-succinimide valerate. The RAFT agent may also be a mixture of at least two of the above-listed initiators.

The radical initiator and the RAFT agent are used at a concentration of about 0.001 to 5.0 wt % with respect to the weight of the monomer.

In the above-described preparation method, the RAFT polymerization step is carried out at a reaction temperature of about 60 to 140° C., for about 30 to 200 hours, more specifically, about 50 to 170 hours.

In the precipitation or re-precipitation step of the preparation method, the nonsolvent is a solvent that does not dissolve the product of the polymerization process or the acrylamide-based polymer. The examples of the nonsolvent may include a polar solvent such as methanol, ethanol, n-propanol, iso-propanol, or ethyleneglycol; or a non-polar solvent such as n-hexane, cyclohexane, or n-heptane. Of course, the nonsolvent may also be a mixture of at least two of the above-listed solvents. The precipitation and re-precipitation processes using the nonsolvent facilitate the production of the polymer having mesoporosity and crystallinity with a high purity.

Further, the electrospun fiber comprising the polymer can be prepared by a method, the method comprising the steps of: dissolving the acrylamide-based polymer comprising at least one repeating unit represented by Chemical Formula 1 in an organic solvent to obtain a polymer solution: and performing electrospinning the polymer solution.

In this method, firstly, the acrylamide-based polymer prepared by the above method is dissolved in an organic solution to produce the polymer solution to be used for electro-spinning.

The solvent used for dissolving the polymer can be any being capable of dissolving the polymer. For examples, the solvent may comprise at least one nonpolar solvent selected from the group consisting of n-hexane, cyclohexane, benzene, toluene, chlorobenzene, dichlorobenzene, methylenechloride and 1,-dichloroethan; or at least one polar solvent selected from the group consisting of acetone, chloroform, tetrahydrofuran (THF), dioxane, monoglyme, diglyme, dimethylformamide (DMF), dimethylsulphoxide (DMSO) and dimethylacetamide (DMAC). A mixed solvent including at least two solvents selected from the non-polar solvents or polar solvents, or a mixed solvent including the non-polar solvent and the polar solvent can be used. When the mixed solvent is used, the polar solvent is preferably contained in an amount of about 60-90 wt % based on the total mixed solvent. In the polymer solution, the polymer is preferably dissolved in the solvent at an amount of about 10 to 40 wt %.

The kind and concentration of the solvent can be selected depending on the chemical structure and molecular weight of the acrylamide-based polymer.

After preparing the polymer solution, the electrospun fiber can be formed by carrying out the electro-spinning the solution. The chemical or physical properties of the electrospun fiber can be affected by the molecular structure, morphological structure and molecular weight of used polymer, the kind and concentration of solvent, the spinning speed (mL/min) of polymer solution, voltage applied for the electro-spinning device, the diameter of spinning needle, the distance between the needle and fiber collector and the like.

In these aspects, to prepare the electrospun fiber having more uniform pore size and diameter, the electro-spinning may be carried out by applying about 10 to 30 kV preferably. The electro-spinning device includes a nozzle with a diameter of about 20 to 30 gauge where the distance between nozzle and the collector is preferably about 10 to 20 cm.

In addition, the spinning speed may be dependent on the kind and molecular weight of polymer, and the kind and concentration of solvent, and for example, the spinning speed may be preferably about 5 to 20 mL/min, in order to prepare the uniform electrospun fiber that shows the properties and does not form bead.

According to the method, the electrospun fiber having the porosity and large surface area can be prepared, and the adsorbent according to an embodiment of the invention can be provided using the electrospun fiber.

Meanwhile, the adsorbent according to an embodiment of the invention can be prepared and provided according to generally known compositions and methods of the conventional adsorbent of VOCs, except that it comprises the specific acrylamide-based polymer or electrospun fiber. In addition, the adsorbent may further comprise various adsorbent components or other components that has been generally used in the art. The kinds of the components are obviously known to any ordinary skilled person in the art. Further, the polymer or the electrospun fiber in the adsorbent can be modified by other components with the proviso that the polymer and the electrospun maintain their porosity and superior adsorption property.

Also, the adsorbent can be used for adsorption of various VOCs. The examples of the VOCs includes benzene, toluene, nitrobenzene, chlorobenzene, chloroform, 1,2-dichloroethane, hexane, heptane, octane, nonane, decane, dodecane, tetradecane, diesel, kerosene, acetone, ethylacetate, dimethyl formamide, dimethyl sulfone, formaldehyde, tetrahydrofuran (THF) or their derivatives, and so on. Further, the adsorbent can be used for adsorption of other various VOCs.

The adsorbent may be used according to a general method for adsorption of VOCs. The method may comprise the step of: contacting and adsorbing VOCs onto the adsorbent, and the VOCs can be adsorbed and removed by this method.

Advantageous Effects

As described above, the present invention provides an adsorbent of VOCs showing significantly improved adsorption property, compared to conventional adsorbents. The superior properties of the adsorbent seem to result from the properties such as porosity of novel acrylamide-based polymer and electrospun fiber comprising the polymer.

Thus, various VOCs can be effectively and practically removed using the adsorbent.

MODE OF INVENTION

Figure 1:
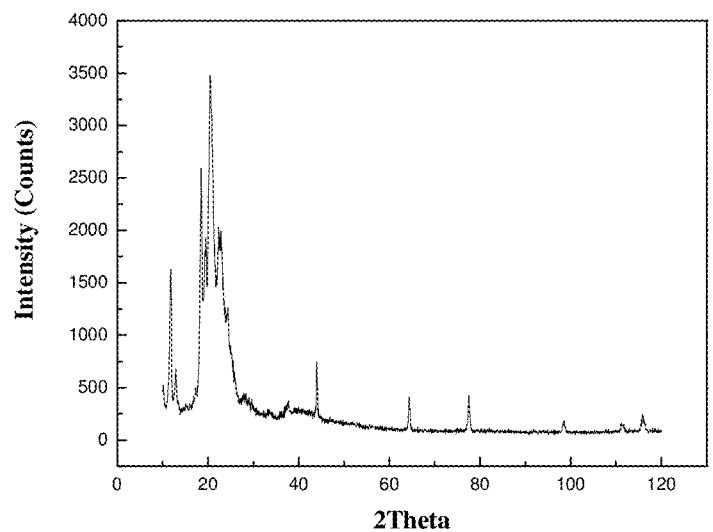
FIG. 1 shows the X-ray diffraction pattern of a DOPPPAM crystal obtained in Example 3.

In the following are set forth specific examples according to the invention, describing the function and effect of the invention in further detail. It is to be understood that the examples are only for illustrative purposes and are not intended to limit the scope of the invention.

Examples 1, 2 and 3

Synthesis of Acrylamide-Based Monomer and Determination of Crystallinity

Example 1

Synthesis of p-Dodecylphenylacrylamide (DOPAM) and Preparation of Single Crystal Firstly, p-dodecylaniline (12 g, 0.046 mol) was dissolved in THF solvent (100 mL). The solution was poured into a 100 mL three-mouthed round flask, and an acid eliminator was added dropwise through a funnel for 10 minutes, where the acid eliminator contained imidazole and triethyl amine at the same mole fraction (0.023 mol). Under the nitrogen atmosphere, a solution containing acryloyl chloride (3.8 mL, 0.047 mol) in THF (20 mL) was gradually added dropwise to the mixed solution through a dropping funnel for 20 minutes. Meanwhile, the solution was cooled on ice bath to prevent the temperature of the reaction mixture from rising above 5° C. After 6 hours of reaction at 0° C., the solution was kept at 25° C. for more 9 hours of reaction. Upon completion of the reaction, the solution was passed through a filter paper to eliminate precipitated salts, and the solvent was evaporated from the filtrate on an evaporator. The solid thus obtained was dissolved in dichloromethane (100 mL) and added to a separatory funnel along with 10% aqueous $NaHCO_3$ solution (50 mL). The funnel was shaken vigorously and set aside to allow for the complete separation of the aqueous phase and thereby to remove unreacted acryloyl chloride. Magnesium sulfate (1.0 g) was added to the separated dichloromethane solution. After stirred for 5 hours, the solution was subjected to filtration to remove a trace amount of water dissolved in the solvent. The dichloromethane solution thus obtained was kept on the evaporator, and n-hexane (100 mL) was added. The solution was stirred for 2 hours, and unreacted p-dodecyl aniline was filtered out from the solution. The filtrate was then removed of the solvent on the evaporator to yield a white solid DOPAM product (yield 95%). The chemical structure of the DOPAM product was identified by hydrogen nuclear magnetic resonance ($^1$H-NMR) spectrum. The results were as follows.

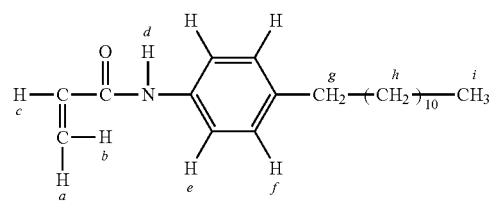

$^1$H-NMR ($CDCl_3$): e, 7.5 (d, 2H); d, 7.2 (s, 1H); f, 7.15 (d, 2H); b, 6.4 (d, 1H); c, 6.2 (q, 1H); b, 5.8 (d, 1H); g, 2.6 (t, 2H); h, 1.25-1.35 (m, 20H); i, 0.935 (t, 3H).

The DOPAM product ($T_m$=101° C.) was purified by recrystallization with ethanol three times. The purified DOPAM was added to THF solvent, an several drops of a non-polar solvent was added. The solution was kept below −10° C. for a defined period of time to grow single crystals of the monomer.

It turned out that the growth rate of the single crystals was dependent on the composition and proportion of polar and non-polar solvents, crystal growth time and temperature, and the structure and concentration of the crystal growth agent added.

XRD (X-Ray Diffractometry) was used to identify the crystal structure of the single crystals obtained in Example 1. The crystallographic data thus obtained is presented in Table 1, which shows that the single crystals of the monomer of Example 1 have a monoclinic crystal structure.

TABLE 1

Crystallographic Data for Single
Crystals of Monomer of Example 1

| | |
|---|---|
| Empirical Formula | $C_{21}H_{33}N_1O_1$ |
| Formula weight | 315.48 |
| Temperature [K] | 293(2) K |
| Wavelength [Å] | 0.71073 |
| Crystal system, space group | Monoclinic, $P2_1/c$ |
| a [Å] | 4.7055(13) |
| b [Å] | 43.315(16) |
| c [Å] | 9.4150(19) |
| β [°] | 95.158(19) |
| Volume [Å$^3$] | 1911.2(10) |
| $d_{calcd}$ [gcm$^{-3}$] | 1.096 |
| μ [mm$^{-1}$] | 0.066 |
| F(000) | 696 |
| Crystal size [mm] | 0.55 × 0.30 × 0.25 |
| θ Range [°] | 1.88-26.33 |
| Data/parameters | 1845/213 |
| GOF on F$^2$ | 1.111 |
| R1, wR2 [I > 2σ(I)] | 0.0975, 0.2551 |
| Largest diff. peak and hole [e.Å$^{-3}$] | 0.358 and −0.343 |

Example 2

Synthesis of p-Tetradecylphenylacrylamide (TEPAM) and p-hexadecylphenylacrylamide (HEPAM) and Preparation of Single Crystal TEPAM and HEPAM were synthesized with the yields of 90% and 93%, respectively in the same manner as described in Example 1, excepting that p-tetradecylaniline having 14 carbon atoms or p-hexadecylaniline having 16 carbon atoms was used instead of p-dodecylaniline having 12 carbon atoms. The single crystals of TEPAM and HEPAM were grown and identified through XRD analysis technique in the same manner as described in Example 1, revealing that the single crystals had a monoclinic crystal structure.

Example 3

Synthesis of N-[4-(3-(5-(4-dodecyl-phenylcarbamoyl)pentyl-carbamoyl)-propyl)phenyl acrylamide (DOPPPAM) and Preparation of Single Crystal 4-(4-aminophenyl)butyric acid (6 g, 3.36 mmol) was added to a 200 mL three-mouthed round flask, and methylene chloride (100 mL) was added and dissolved under the nitrogen atmosphere at 40° C. To the solution was added chlorotrimethyl silane (6.0 mL). The solution was refluxed and agitated for 2 hours and, after reaction, cooled down to the room temperature. While kept at 0 to 5° C. on an ice bath under the nitrogen atmosphere, an acid eliminator (in an excess amount by 10% in concentration relative to the reactant) was added dropwise through a funnel for 10 minutes, where the acid eliminator contained imidazole and tetraethyl amine mixed at the same mole fraction. In the same manner, a solution containing acryloyl chloride (2.8 mL) in methylene chloride (30 mL) was added dropwise for 20 minutes, and the solution was kept for 30 minutes of reaction and then warmed up to the room temperature for 2 more hours of reaction. After the solvent was removed, 2M sodium hydroxide solution (200 mL) was added, and the solution was stirred for 2 hours. The aqueous solution was weak-acidified (pH 5-6) with a 2M hydrogen chloride solution to form an aqueous solution containing a white precipitate. This solution was added to a separatory funnel along with ethylacetate (200 mL) and shaken up to cause phase separation into aqueous and ethylacetate layers. The solvent in the ethylacetate layer where the product is dissolved was removed on an evaporator, and the residual solid was dried out in a vacuum oven for 24 hours to yield a white 4-(4-acrylaminophenyl)butyric acid (APB) solid (yield 92%). The melting point of the solid was 107° C.

Subsequently, N-(t-butylester)caproic acid (6.0 g, 25.1 mmol) and 4-dodecylamine (5.1 g) were added to a 500 mL three-mouthed round flask, and THF (300 mL) was added and dissolved at 0~5° C. on an ice bath under the nitrogen atmosphere. DMAP (1.59 g, 12.9 mmol) was added as a catalyst, and the solution was stirred for 10 minutes. EDC (5.98 g, 31.2 mmol) was added as a moisture remover, and the solution was stirred for one hour and then 18 more hours at the room temperature. After the reaction, the solution was precipitated in distilled water (1200 mL) and stirred for one hour. The residual substances, such as DMAP, EDC, EDC urea salt and THF were filtered out, and a reactant-product mixture was then extracted. An aqueous $NaHCO_3$ solution (200 mL) was added three times to the extracted mixture, and the solution was stirred for one hour and removed of unreacted N-(t-butylester)caproic acid through filtration. To the solid obtained was added n-hexane (600 mL), and the solution was stirred for one hour and removed of unreacted 4-dodecylaniline through filtration. The residual solid was dried out in a vacuum oven for 24 hours to yield a white 5-(4-dodecylphenyl-carbamoyl)pentyl)-carbamic acid t-butyl ester solid (yield 91%).

The solid product, 5-(4-dodecylphenyl-carbamoyl)pentyl)-carbamic acid t-butyl ester (6.0 g, 12.6 mmol) was added to a one-mouthed round flask, and methylene chloride (150 mL) was added and dissolved at the room temperature. Trifluoroacetic acid (18.9 mL, 2.52 mol) was added, and the solution was stirred for 2 hours and removed of the solvent. Ethylether (90 mL) was added, and the solution was stirred for 30 minutes and then removed of unreacted 5-(4-dodecylphenyl-carbamoyl)pentyl)-carbamic acid t-butyl ester through filtration. The residual solid was dried out in a vacuum oven for 24 hours to yield a white 5-(4-dodecylphenyl-carbamoyl)pentyl)-amine solid (yield 97%).

The above 5-(4-dodecylphenyl-carbamoyl)pentyl)-amine solid (3.0 g, 7.9 mmol) and the APB solid (1.86 g) previously obtained were added to a 500 mL three-mouthed round flask, and THF (150 mL) was added and dissolved at 0~5° C. on an ice bath under the nitrogen atmosphere. DMAP (1.95 g, 10.1 mmol) was added as a catalyst, and the solution was stirred for 10 minutes. EDC (1.831 g, 9.6 mmol) was added as a moisture remover, and the solution was stirred for one hour and then 18 more hours at the room temperature. After the reaction, the solution was precipitated in distilled water (600 mL) and stirred for one hour. The residual substances, such as DMAP, EDC, EDC urea salt and THF were filtered out, and a reactant-product mixture was then extracted. An aqueous NaHCO$_3$ solution (600 mL) was added to the extracted mixture, and the solution was stirred for one hour and removed of unreacted ABP through filtration. To the solid thus obtained was added ethanol (300 mL), and the solution was stirred for one hour and removed of unreacted 5-(4-dodecylphenyl-carbamoyl)pentyl)-amine through filtration. The residual solid was dried out in a vacuum oven for 24 hours to yield a white DOPPPAM solid (yield 89%, melting point 174° C.).

The DOPPPAM thus obtained was dissolved in THF solvent, and several drops of a non-polar solvent were added. To the solution was added a trace of a crystal growth agent to cause crystal growth at a low temperature below −10° C. for a defined period of time, thereby producing pure needle-like DOPPPAM crystals. The chemical structure of the pure DOPPPAM was identified by hydrogen nuclear magnetic resonance ($^1$H-NMR) spectrum. The results were as follows. In addition, the crystallinity of the DOPPPAM having the needle-like crystal form was identified through XRD analysis technique.

Chemical Formula 3. The polymerization conversion and the number-average molecular weight were 48% and 14900, respectively. The homopolymer had a very narrow molecular weight distribution of 1.25 and a melting point ($T_m$) of 241° C.

[Chemical Formula 3]

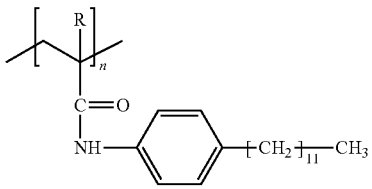

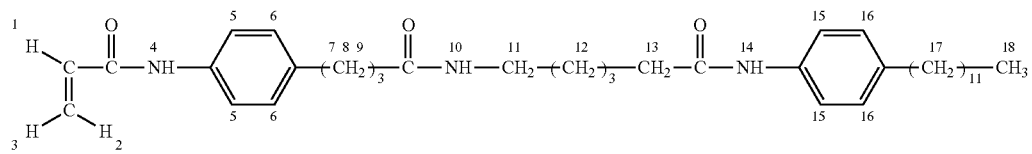

$^1$H-NMR (DMSO-d6): 4, 10.06 (s, 1H); 14, 9.76 (s, 1H); 10, 7.78 (m, 1H); 5, 7.59 (m, 2H); 6, 7.23 (m, 2H); 15, 7.12 (d, 2H); 16, 7.08 (d, 2H); 1, 6.42 (q, 1H); 2, 6.24 (d, 1H); 3, 5.72 (d, 1H); 11, 3.01 (m, 2H); 7, 2.26 (m, 2H); 9, 2.06 (m, 2H); 8, 1.78 (m, 2H); 13, 1.55 (m, 2H); 17, 1.52 (m, 2H); 12, 1.40 (m, 6H); 17, 1.23 (m, 20H); 18, 0.85 (t, 3H)

Figure 2:
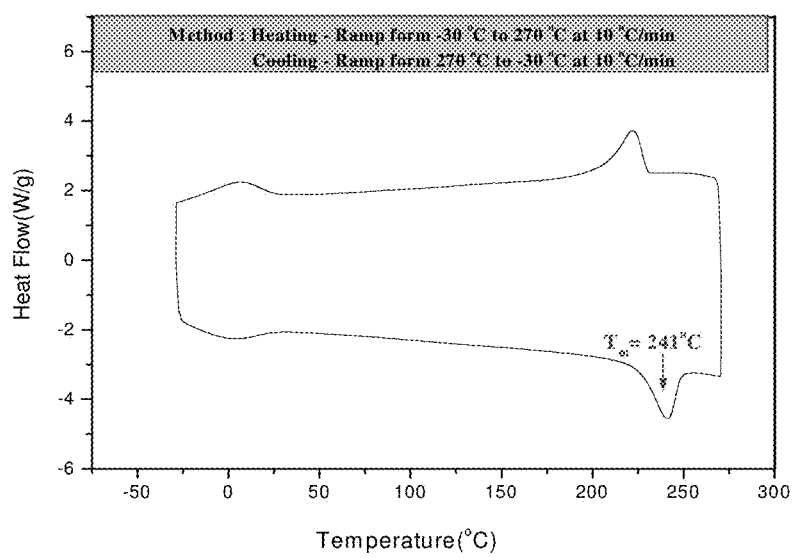
FIG. 2 shows the DSC thermal analysis curve of a polymer prepared in Example 4.

The XRD instrument was used to determine the crystallinity of the needle-like DOPPPAM crystals obtained in Example 3. The X-ray diffraction pattern of the crystals is shown in FIG. 2, which demonstrates that the DOPPPAM also had crystallinity. According to the X-ray diffraction pattern, the monomer of Example 3 also turned out to have a crystal structure in which the individual molecules were very well-arranged spatially in the solid state.

Examples 4-10

Preparation of Novel Acrylamide-Based Mesoporous Polymer

Example 4

Preparation of Poly(DOPAM)-1

The DOPAM monomer (1.0 g) obtained the rod-like crystal form in Example 1 was dissolved in THF (6.3 mL) and poured in a 10 mL Schenk flask along with cyanoisopropyl dithiobenzoate (1.75 mg) as a RAFT agent and AIBN (0.87 mg) as a radical initiator. The solution was stirred under the nitrogen atmosphere for 30 minutes, removed of oxygen and kept in a silicon oil container at 70° C. to cause RAFT polymerization for 72 hours. After the polymerization reaction, the reaction solution was precipitated with methanol (200 mL) and then subjected to filtration to give an orange solid. The solid was dissolved in THF (8 mL) and re-precipitated with an excess of methanol. The light yellowish solid thus obtained was dried out in a vacuum oven for 24 hours to yield a pure homopolymer, Poly[DOPAM]-1 represented by Example 5

Preparation of Poly(DOPAM)-2

The procedures were performed to obtain a pure Poly[DOPAM]-2 polymer in the same manner as described in Example 4, excepting that there were used the DOPAM monomer (1.5 g) obtained in the rod-like crystal form in Example 1, benzene (7.8 mL), cyanoisopropyl dithiobenzoate (2.63 mg) as a RAFT agent and AIBN (1.3 mg) as a radical initiator. The polymerization conversion and the number-average molecular weight were 66% and 35000, respectively. The polymer had a very narrow molecular weight distribution of 1.39 and a melting point ($T_m$) of 242° C.

Example 6

Preparation of Poly(DOPAM)-3

The DOPAM monomer (1.0 g) obtained in the rod-like crystal form in Example 1, mixture 6.5 mL of THF/benzene (mixing volume ratio of 30/70), and BPO (10 mg) as a radical initiator were poured in a 20 mL ampoule and then the oxygen of the solution was removed by freeze-thaw method. The ampoule was sealed and kept at 80° C. in an oven to cause RAFT polymerization for 48 hours. After the polymerization reaction, the reaction solution was precipitated with methanol (30 mL) and then subjected to filtration to give a light yellowish solid. The solid was dissolved in 10 mL of THF and reprecipitated with excess methanol The solid was dried out in a vacuum oven for at least 24 hours to yield a pure homopolymer, Poly(DOPAM)-3. The polymerization conversion and the number-average molecular weight were 94% and 99000, respectively. The homopolymer had a molecular weight distribution of 3.2 and a melting point ($T_m$) of 242° C.

Example 7

Preparation of Poly(DOPAM)-4

The procedures were performed to obtain a pure Poly [DOPAM]-4 polymer in the same manner as described in Example 6, excepting that there were used the DOPAM monomer (1 g) obtained in the rod-like crystal form in Example 1, benzene (6.5 mL), BPO (10 mg) as a radical initiator and polymerization time of 72 hours. The polymerization conversion and the number-average molecular weight were 97% and 115000, respectively. The polymer had a very narrow molecular weight distribution of 3.4 and a melting point (Tm) of 242° C.

Example 8

Preparation of Poly(TEPAM)

The procedures were performed to obtain a pure Poly [TEPAM] polymer represented by Chemical Formula 4 in the same manner as described in Example 7, excepting that there was used the TEPAM monomer (1.0 g) obtained in the rod-like crystal form in Example 2. The polymerization conversion and the number-average molecular weight were 93% and 119100, respectively. The Poly[TEPAM] homopolymer had a very narrow molecular weight distribution of 2.7 and a melting point ($T_m$) of 242° C.

[Chemical Formula 4]

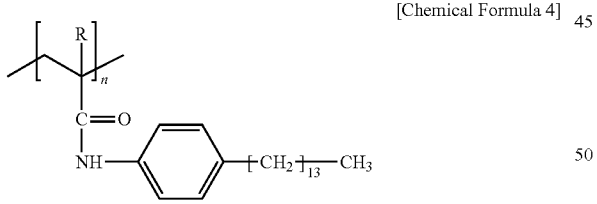

Example 9

Preparation of Poly(HEPAM)

The procedures were performed to obtain Poly[HEPAM] represented by Chemical Formula 5 in the same manner as described in Example 7, excepting that there was used the HEPAM monomer (1.0 g) obtained in the rod-like crystal form in Example 2. The polymerization conversion and the number-average molecular weight were 86% and 61200, respectively. The Poly[HEPAM] homopolymer had a very narrow molecular weight distribution of 2.4 and a melting point ($T_m$) of 241° C.

[Chemical Formula 5]

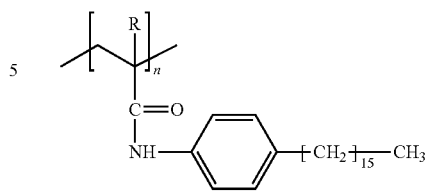

Example 10

Preparation of Poly(DOPPPAM)

The procedures were performed to obtain a light yellowish homopolymer, Poly[DOPPPAM] represented by Chemical Formula 6 in the same manner as described in Example 7, excepting that there were used the DOPPPAM monomer (1.0 g) obtained in the needle-like crystal form in Example 3, DMF (4.22 mL), and DTBP (0.002 mL) as a radical initiator and that polymerization was carried out at 110° C. (polymerization temperature) for 96 hours (polymerization time). The polymerization conversion and the number-average molecular weight were 86% and 39200, respectively. The Poly[DOPPPAM] homopolymer had a very narrow molecular weight distribution of 2.9 and a melting point ($T_m$) of 256° C.

[Chemical Formula 6]

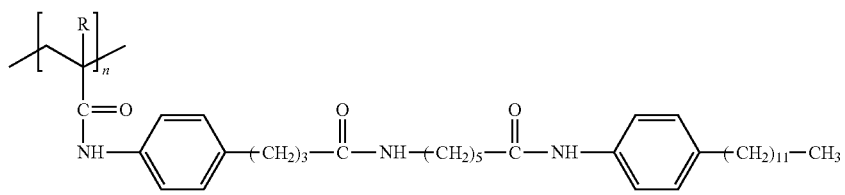

Experimental Example 1

Analysis on Thermal Properties and Solid Structure of Acrylamide-Based Mesoporous Polymer (1) Analysis on Thermal Properties of Polymer by DSC A DSC thermoanalytical instrument was used to examine the phase transition behavior of the Poly(DOPAM), Poly (TEPAM) and Poly(HEPAM) polymers prepared in Examples 4, 8 and 9, respectively. Through the DSC thermoanalysis, the three polymers turned out to be crystalline polymers with melting temperatures ($T_m$) of 241, 237 and 229° C., respectively. The melting temperature ($T_m$) of the polymers had a tendency to lower gradually with an increase in the number of carbon atoms of the aliphatic hydrocarbon introduced at the end in order of 12, 14 and 16. The Poly (DOPPPAM) polymers of Examples 10 of a different chemical structure also turned out to be a crystalline polymer having a melting temperature ($T_m$) of 256° C.

FIG. 2 is a DSC thermal analysis curve showing the behavior of the phase transition temperature of Poly(DOPAM)-1 obtained in Example 4. Referring to FIG. 2, the melting temperature ($T_m$) of the mesoporous structure formed by the polymer chain of the Poly(DOPAM) polymer was 241° C.

The melting temperatures ($T_m$) of the minute crystals formed from the aliphatic hydrocarbon introduced at the end of the repeating unit were about 5° C. As the phase transition melting temperatures appeared in the almost same temperature range on both heating and cooling curves with the same heat capacity, the porous structure formed among the polymer chains of the Poly(DOPAM) polymer was presumably oriented in a relatively stable way. There was no significant difference in the melting temperature ($T_m$) when the Poly(DOPAM) polymer had a number-average molecular weight greater than 8000.

(2) Analysis on Porous Structure of Polymer by TEM

Figure 3:
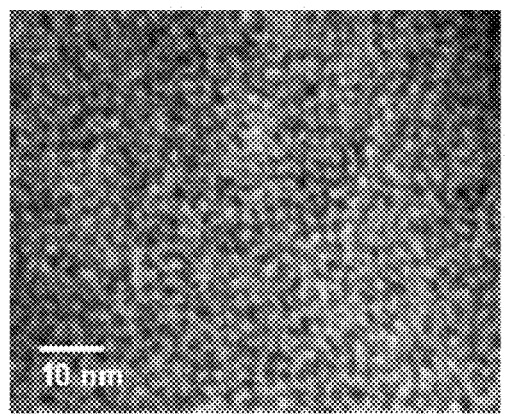
FIG. 3 shows the TEM picture of a thin film including the polymer of Example 4.

A thin film including the polymer Poly(DOPAM)-1 of Example 4 was made and taken to get the TEM (Transmission Electron Microscopy) image as shown in FIG. 3. The thin film was prepared in the manner that the solid powder of Poly(DOPAM)-1 was annealed at the melting temperature for 6 hours and quenched in liquid nitrogen. FIG. 3 is the TEM image of the thin film that was cut up in thickness about 50 to 120 nm and subjected to deposition of $RuO_4$ vapor. Referring to FIG. 3, the dark part shows the $RuO_4$ vapor deposited on the benzene group introduced in the polymer chain of Poly(DOPAM)-1 forming the frame of the cylindrical structure. It can be seen from FIG. 6 that the bright image structure with a pore size of about 3.5 nm is relatively uniformly distributed over the surface of the thin film. In conclusion, the polymers of the Examples contained a large number of pores with a uniform pore size. Thus, the polymers of the Examples were predicted to have superior adsorption property of VOCs due to the mesoporosity.

Example 11-17

Preparation of Porous Electrospun Fiber from Novel Mesoporous Acrylamide-Based Polymer Example 11

Poly(DOPAM)-3 (1.0 g) obtained Example 6 was dissolved in 5.1 mL of THF to produce the polymer solution with using electro-spinning device (ESR-200RD) (NanoNC). 5 mL of the polymer solution was poured into a syringe and was applied for electro-spinning device by using stainless needle having 25 gauge (diameter of 0.508 mm) under the condition of applied voltage of 15 kV, spinning speed of 15 mL/min, and the distance of 12 cm between the needle and collector to produce electrospun fiber. The result confirmed that the electrospun fiber had a diameter of 250 to 450 nm, and uniformly-distributed pore of diameter 20 to 50 nm on its surface.

Example 12

The procedures were performed to obtain a electrospun fiber in the same manner as described in Example 11, excepting that there were used the mesoporous polymer Poly(DOPAM)-4 (1.0 g) prepared in Example 7, 2.9 mL of THF, and applied voltage of 10 kV. The result confirmed that the electrospun fiber had a diameter of about 7 μm, and uniformly-distributed pore of diameter 70 to 400 nm on its uniform surface without any bead.

Example 13

The procedures were performed to obtain a electrospun fiber in the same manner as described in Example 1, excepting that applied voltage of 15 kV was used. The result confirmed that the electrospun fiber had a diameter of about 6 μm, and uniformly-distributed pore of diameter 100 to 300 nm on its surface.

Example 14

The procedures were performed to obtain a electrospun fiber in the same manner as described in Example 12, excepting that there were used 3.4 mL of THF, and applied voltage of 20 kV. SEM pictures of the electrospun fiber were shown in FIGS. 4a and 4b. The result confirmed that the electrospun fiber had a diameter of about 2 μm, and uniformly-distributed pore of diameter 50 to 500 nm on its surface.

Example 15

The procedures were performed to obtain a electrospun fiber in the same manner as described in Example 12, excepting that there were used the mesoporous polymer Poly(TEPAM)(1.0 g) prepared in Example 8 and applied voltage of 10 kV. The result confirmed that the electrospun fiber had a diameter of about 4 to 7 μm, and uniformly-distributed pore of diameter 100 to 500 nm on its surface.

Example 16

The procedures were performed to obtain a electrospun fiber in the same manner as described in Example 12, excepting that there were used the mesoporous polymer Poly(HEPAM)(1.0 g) prepared in Example 9 and applied voltage of 20 kV. The result confirmed that the electrospun fiber had a diameter of about 2 to 4 μm, and uniformly-distributed pore of diameter 100 to 250 nm on its surface.

Example 17

The procedures were performed to obtain a electrospun fiber in the same manner as described in Example 11, excepting that there were used the mesoporous polymer Poly(DOPPAM)(1.0 g) prepared in Example 10, 3.2 mL of DMF, and applied voltage of 15 kV. The result confirmed that the electrospun fiber had a diameter of about 500 nm to 1.0 μm, and uniformly-distributed pore of diameter 40 to 80 nm on its surface.

Experimental Example 2

Analysis of Electrospun Fiber

Figure 4A:
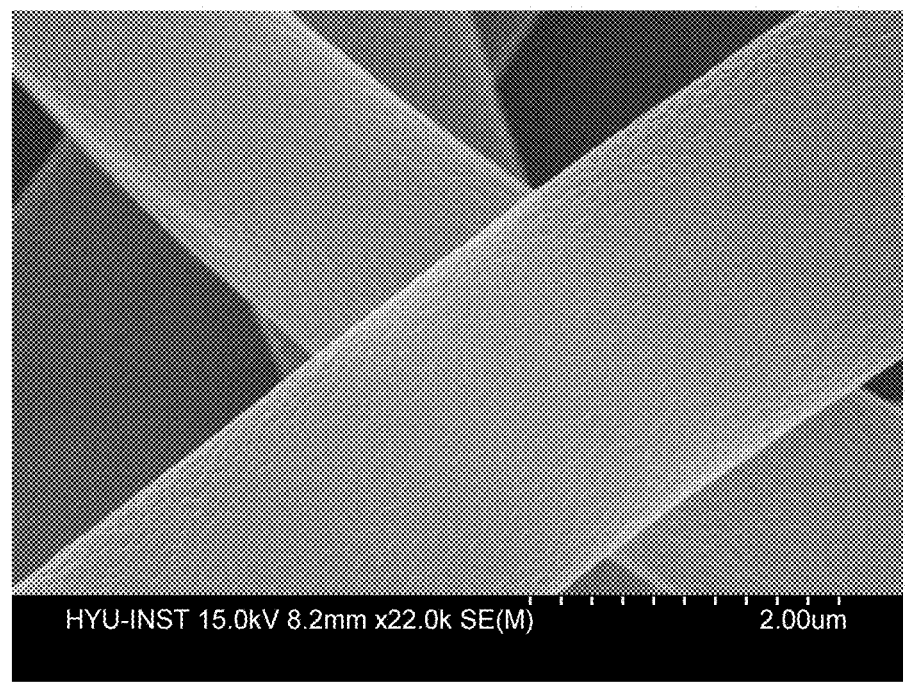
FIGS. 4a and 4b shows the SEM picture of electrospun fiber obtained in Example 14
Figure 4B:
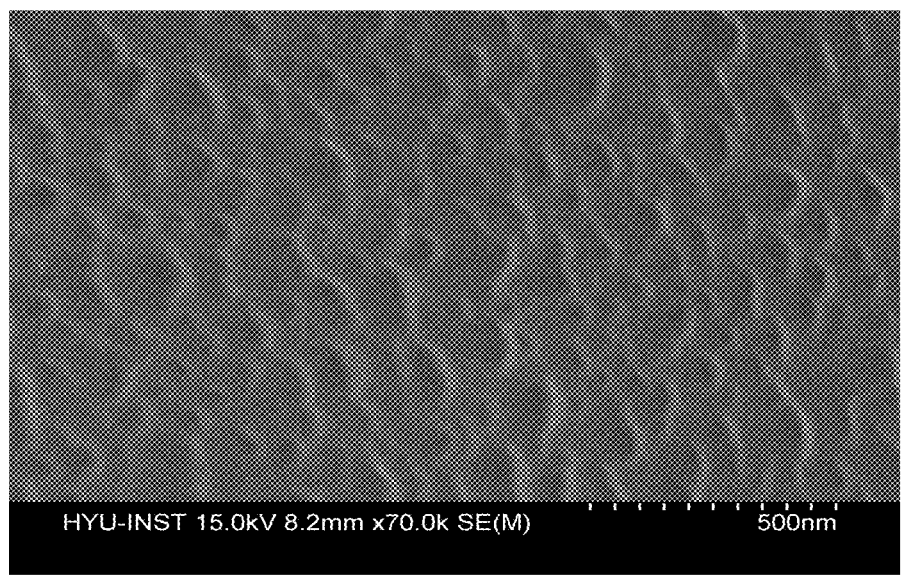

In the Example, the diameter and surface morphology of electrospun fiber was analyzed by SEM (scanning electron microscope, Hitachi S-4800). The SEM pictures are shown in FIGS. 4a to 4b. More specifically, the polymer solution of each Example was electrospun directly to silicon wafer (silicon wafer, 2.0×2.0 cm) to obtain the electrospun fiber. The electrospun fiber was dried under the vacuum, and analyzed at 15.0 kV with SEM.

Referring to the Examples and FIGS. 4a to 4b, the electrospun fiber of Examples 11 to 17 showed porosity that the uniformly-sized pores were on the surface of electrospun fiber, and had large surface area with the controlled diameter without forming bead. Thus, the electrospun fibers of the Examples were predicted to have superior adsorption property of VOCs due to the porosity and large surface area.

Experimental Example 3

Evaluation for Adsorption Property of VOCs Using Acrylamide-Based Mesoporous Polymer The adsorption property of the solid samples of the acrylamide-based polymers obtained from Examples was measured for benzene steam using a BET (Brunauer-Emmett-Teller) surface analyzing apparatus of BELSORP-aqua3 manufactured by BEL Japan, Inc. Specifically, the solid powders of Poly(DOPAM)-1 (0.1167 g) of Example 4 or Poly (DOPAM)-2 (0.1127 g) or Example 5 were injected into the apparatus, and then benzene steam was supplied at a temperature of 25° C. After 500 seconds, the amount of the benzene adsorbed on the solid powder samples of the polymers was measured.

Figure 5:
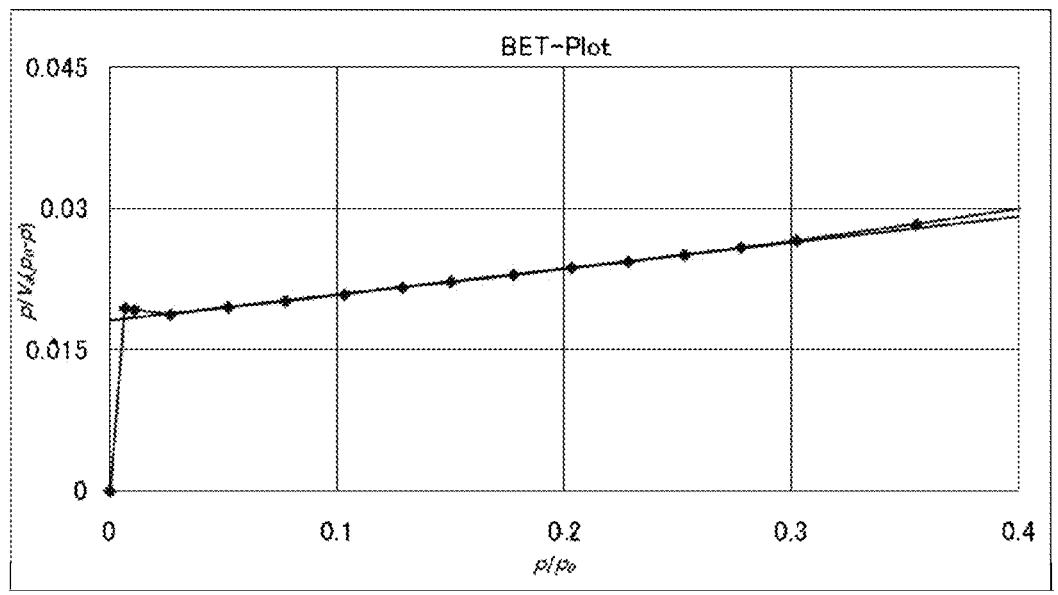
FIG. 5 shows BET-Plot graph measured for evaluating adsorption property for VOCs (benzene) of the polymer of Example 4.

FIG. 5 shows a relation between the surface area of the solid polymer powder of Example 4 and the monolayer adsorption volume of the benzene using well-known BET-Plot method. Referring to FIG. 5, the polymer of Example 4 showed the results of 253 m$^2$/g and 21.9 cc/g, and the polymer of Example 5 showed the results of 252 m$^2$/g and 21.8 cc/g. From these results, it was confirmed that the polymers of Examples can adsorb about 19.4 g of the benzene steam per 1.0 g of the polymer.

Figure 6:
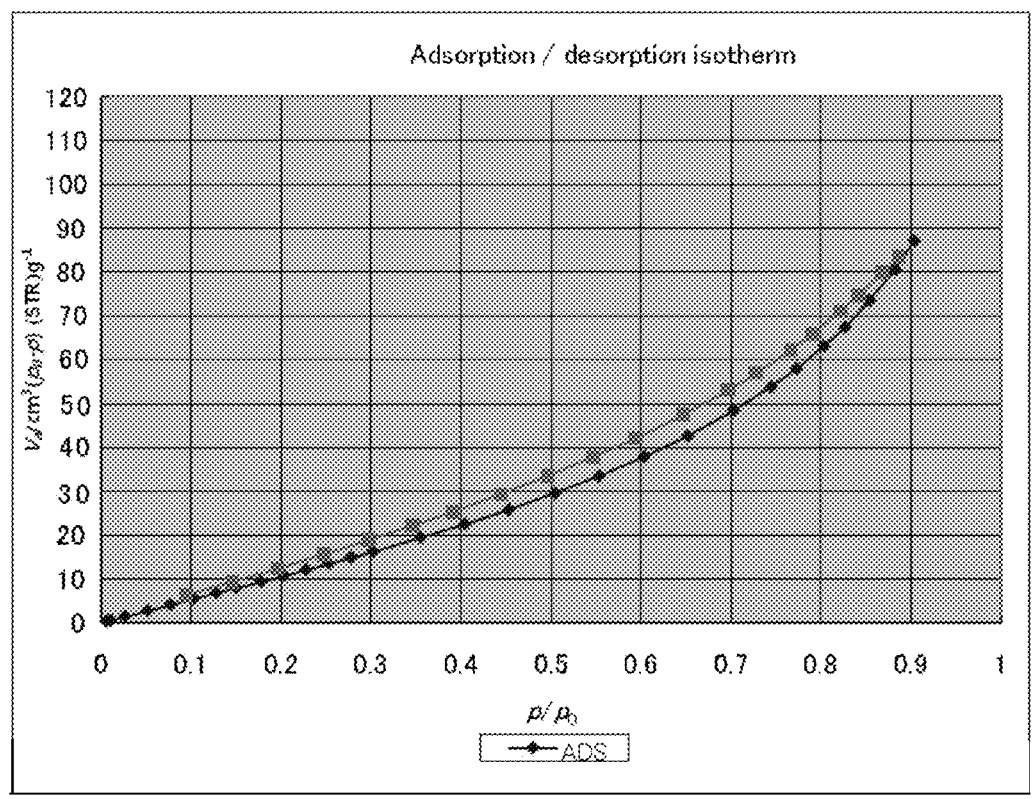
FIG. 6 shows isothermal adsorption/desorption curve for VOCs (benzene) of the polymer of Example 4.

FIG. 6 shows isothermal adsorption/desorption curve for VOCs (benzene steam) of the polymer of Example 4. Referring to FIG. 6, it was confirmed that the polymer was very stable as the adsorbent of the benzene.

The invention claimed is:

1. An adsorbent of volatile organic compounds (VOCs) comprising an acrylamide-based polymer comprising at least one repeating unit represented by Chemical Formula 1:

[Chemical Formula 1]

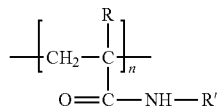

In Chemical Formula 1,
n is an integer of 15 to 1,800,
R is hydrogen or methyl; and
R' is X,

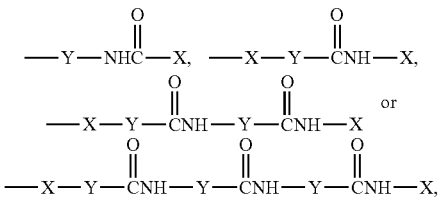

wherein X is —Z—R''; Y is alkylene having 1 to 10 carbon atoms; Z is arylene having 6 to 20 carbon atoms; and R'' is a linear or branched hydrocarbon having 10 to 20 carbon atoms, or a linear or branched perfluorohydrocarbon having 10 to 20 carbon atoms.

2. The adsorbent of VOCs of claim 1, wherein the acrylamide-based polymer includes a plurality of pores having a diameter of 2.0 to 10.0 nm.

3. The adsorbent of VOCs of claim 1, wherein the acrylamide-based polymer has a number-average molecular weight of 5,000 to 500,000.

4. The adsorbent of VOCs of claim 1, wherein the adsorbent comprises a porous electrospun fiber comprising the acrylamide-based polymer.

5. The adsorbent of VOCs of claim 4, wherein the porous electrospun fiber includes a plurality of pores having a diameter of 20 to 500 nm on surface.

6. The adsorbent of VOCs of claim 4, wherein the porous electrospun fiber has a diameter of 200 nm to 10 .mu.m.

7. The adsorbent of VOCs of claim 1, wherein the adsorbent is used for removal of at least one VOC selected from the group consisting of benzene, toluene, nitrobenzene, chlorobenzene, chloroform, 1,2-dichloroethane, hexane, heptane, octane, nonane, decane, dodecane, tetradecane, diesel, kerosene, acetone, ethylacetate, dimethyl formamide, dimethyl sulfone, formaldehyde, tetrahydrofuran (THF) and their derivatives.

8. The adsorbent of VOCs of claim 1, wherein the adsorbent adsorbs 15 g or more of the VOCs per 1.0 g of the acrylamide-based polymer.

9. An adsorption method of VOCs comprising the step of contacting and adsorbing VOCs onto the adsorbent of claim 1.

* * * * *